United States Patent [19]

Obermeier

[11] 4,406,677

[45] Sep. 27, 1983

[54] DUAL CYCLONE DUST SEPARATOR FOR EXHAUST GASES

[76] Inventor: Hans-Johann Obermeier, No. 22, Ketzbergerstrasse, 5650 Solingen, Fed. Rep. of Germany

[21] Appl. No.: 324,751

[22] Filed: Nov. 25, 1981

[30] Foreign Application Priority Data

Dec. 20, 1980 [DE] Fed. Rep. of Germany ....... 3048239

[51] Int. Cl.³ .............................................. B01D 50/00
[52] U.S. Cl. ........................................ 55/315; 55/345; 55/399; 55/417; 55/459 B; 55/461; 209/144
[58] Field of Search .................. 55/346, 349, 399, 437, 55/461, 459 R, 459 B, 315, 325, 326, 337, 345, 417; 209/144

[56] References Cited

U.S. PATENT DOCUMENTS

| | | | |
|---|---|---|---|
| 445,390 | 1/1891 | Cosgrove | 209/144 X |
| 821,819 | 5/1906 | Neumann | 209/144 |
| 1,897,195 | 2/1933 | Howden | 209/144 |
| 1,908,181 | 5/1933 | Prouty | 209/144 |
| 1,928,702 | 10/1933 | O'Mara | 209/144 X |
| 3,091,334 | 5/1963 | Morton | 209/144 X |
| 3,960,734 | 6/1976 | Zagorski | 55/349 X |
| 4,246,013 | 1/1981 | Truhan et al. | 55/435 X |

*Primary Examiner*—Kathleen J. Prunner
*Attorney, Agent, or Firm*—John C. Smith, Jr.

[57] ABSTRACT

A cyclone dust separator for the separation of coarse, small and very fine particles of dust from a dust-laden current of exhaust air or exhaust gas, which is conveyed eccentrically from above, and via a dust pipe, from a fan to a separating vessel is provided. The separated particles of dust are intercepted in a collector mounted underneath the separating vessel, a pipe conduit being inserted centrally from above into the separating vessel in order to lead off the current of pure air or pure gas, while a round upper part, in which the dust pipe terminates eccentrically, is mounted on the separating vessel. In the upper part the mixture of dust and air is subdivided into two separate currents taking an approximately circular coarse. This enables coarse, fine and very fine dust to be separated in an optimum manner even when considerable quantities of dust-laden air have to pass through the apparatus.

9 Claims, 4 Drawing Figures

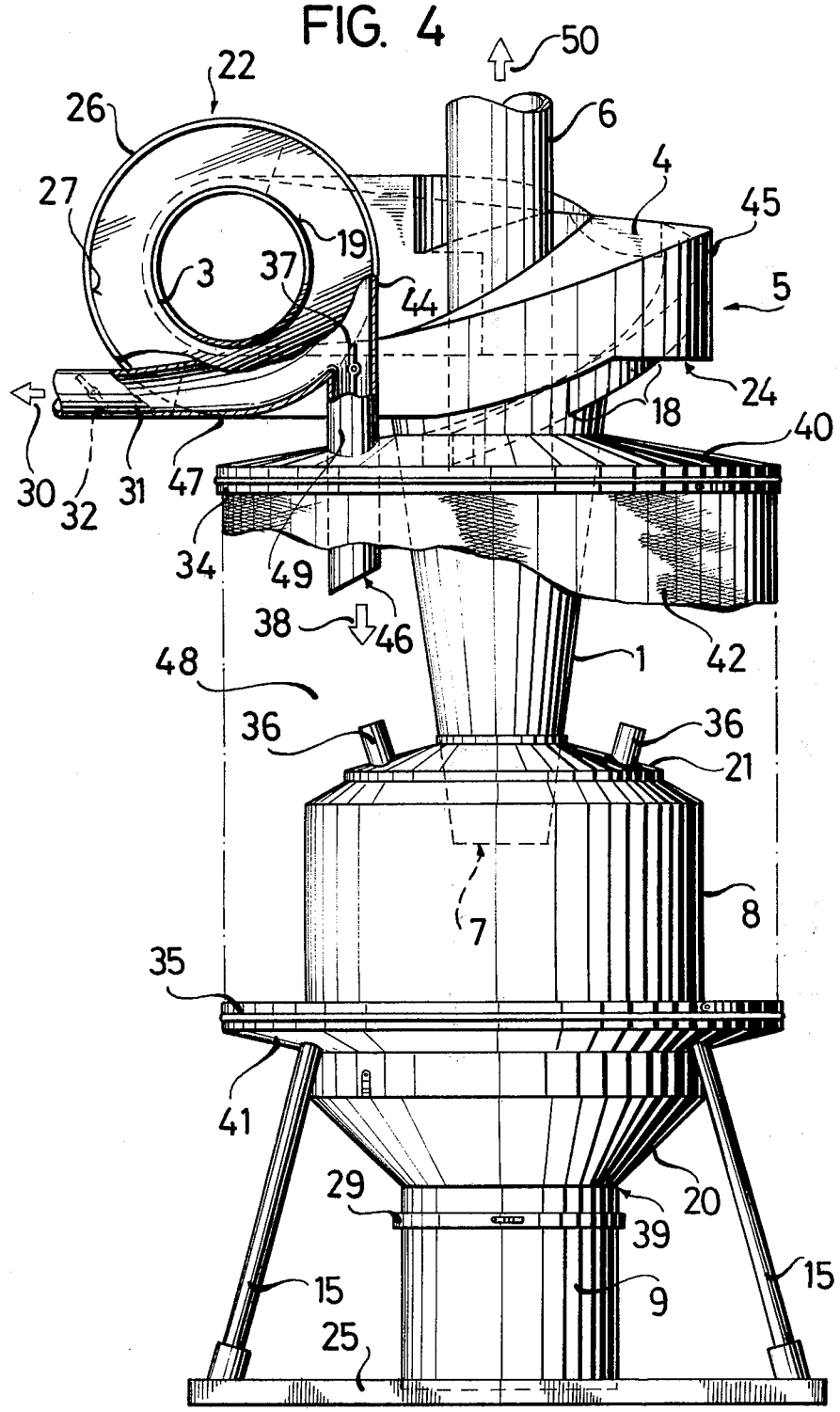

DUAL CYCLONE DUST SEPARATOR FOR EXHAUST GASES

BACKGROUND OF THE INVENTION

This invention relates to a cyclone dust separator for the separation of coarse, small and very fine particles of dust from a dust-laden current of exhaust air or exhaust gas, which is conveyed eccentrically from above, and via a dust pipe, by a fan with a dust conduit to a separating vessel.

Systems are known in which small particles from dust-laden air, in order to purify the air from factory premises or flue gases, are separated in cyclone-type separators and removed to a collector. A cyclone separator of this kind, constructed on rotationally symmetrical lines, is supplied eccentrically in its upper part with the dust-laden air coming from a fan at a high speed, so that the heavier particles of dust, under the effect of the centrifugal forces, are conveyed outwards onto the wall of the vessel, while the purified gases can be led off via a plunger pipe inserted in a central position in the upper part of the vessel. The circular movement of the particles of dust is impeded by the friction between these particles and the wall of the vessel, and they fall slowly into the collector which is provided underneath the separating vessel and from which they can be removed without difficulty.

In a dust separator of the type known from German Offenlegungsschrift No. 29 25 245 a current of gas dust and a current of gas are conveyed eccentrically and separately to a round upper part and combined in coaxial annular chambers after entering the separating chamber, in which process the current of gas dust is radially outermost and the current of gas radially innermost.

The known dust separators, however, have not proved satisfactory in cases in which not only coarse but also fine dust has to be removed as completely as possible by a cyclone separator and the dust has to be transported together with large quantities of air.

SUMMARY OF THE INVENTION

It is, therefore, the object of the present invention to provide a cyclone dust separator which ensures the optimum separation of coarse, fine and very fine dust even when large quantities of dust-laden air have to be coped with. At the same time the over-all height of the apparatus is to be kept moderate, so that the dust separator can be installed on enclosed factory premises, e.g. inside a building.

To attain this object the present invention provides a cyclone dust separator for the separation of coarse, small and very fine particles of dust from a dust-laden current of exhaust air of exhaust gas, which is conveyed eccentrically from above, and via a dust pipe, by a fan to a separating vessel, the separated particles of dust being intercepted in a collector mounted underneath the separating vessel, a pipe conduit being inserted centrally from above into the separating vessel in order to lead off the current of pure air of pure gas, while a round upper part, in which the dust pipe terminates eccentrically via an opening, is mounted on the separating vessel, characterized in that in the upper part the mixture of dust and air is subdivided into two separate currents which take an approximately circular course, the first of the currents being guided through a channel, starting on the outer wall of the upper part, into the separating vessel being in the form of a cone and situated underneath the upper part, while the second current, after passing along a circular and inclined path at an angle of approximately 270°, is guided tangentially, through a pipe underneath the dust pipe, to a separator.

The cyclone separator designed in such a manner meets the requirements in a fully satisfactory manner, in addition to offering the advantage that part of the pure air can be conveyed direct to the working space in which the cyclone dust separator is installed and the remainder to further sections of the factory from which a dust-laden current of air has been removed by suction.

A further advantage of the invention resides in the fact that a far greater quantity of air than hitherto can be used for the purpose of conveying the dust into the cyclone dust separator can then escape at the top of the separator through a suitably positioned aperture into an annular separator without carrying particles of dust along with it in any appreciable quantity. The fact that the aperture is provided in the upper part of the separator ensures considerable pressure relief. This enables a relatively ample quantity of dust-laden air to be dealt with, i.e. a quantity which is large in relation to the dimensions selected for the dust separator, and also has a steadying effect on this current, thus improving the operation of removing the dust to the collector.

Advantageously, the separation of the dust is effected in two stages. As is known, the rotation of a mixture of dust and air causes particles of dust to be carried outwards. This phenomenon is utilized both in the upper part and in the separating vessel in the form of a cone. In the upper part the outer current of air, containing a comparatively high proportion of dust, is taken over by a special channel which commences on the outer wall of the upper part. This channel leads from the latter downwards and outwards, taking a spiral course into the conical separating vessel, where the greater part of the dust is separated from the current of air and falls into the dust collector installed in an air-tight manner underneath the separating vessel.

Even if the dust separator constructed in accordance with the invention has to be supplied with a relatively large quantity of air and even though the apparatus is constructed to a far smaller over-all height than the known types of dust separator a dust removal rate of over 99% can be achieved.

BRIEF DESCRIPTION OF THE DRAWINGS

An embodiment of the invention will now be described by way of example and with reference to the accompanying drawings in which:

FIG. 4 is a side view of the entire cyclone dust separator, part of the filter cloth being omitted.

DESCRIPTION OF THE PREFERRED EMBODIMENT

Figure 1:
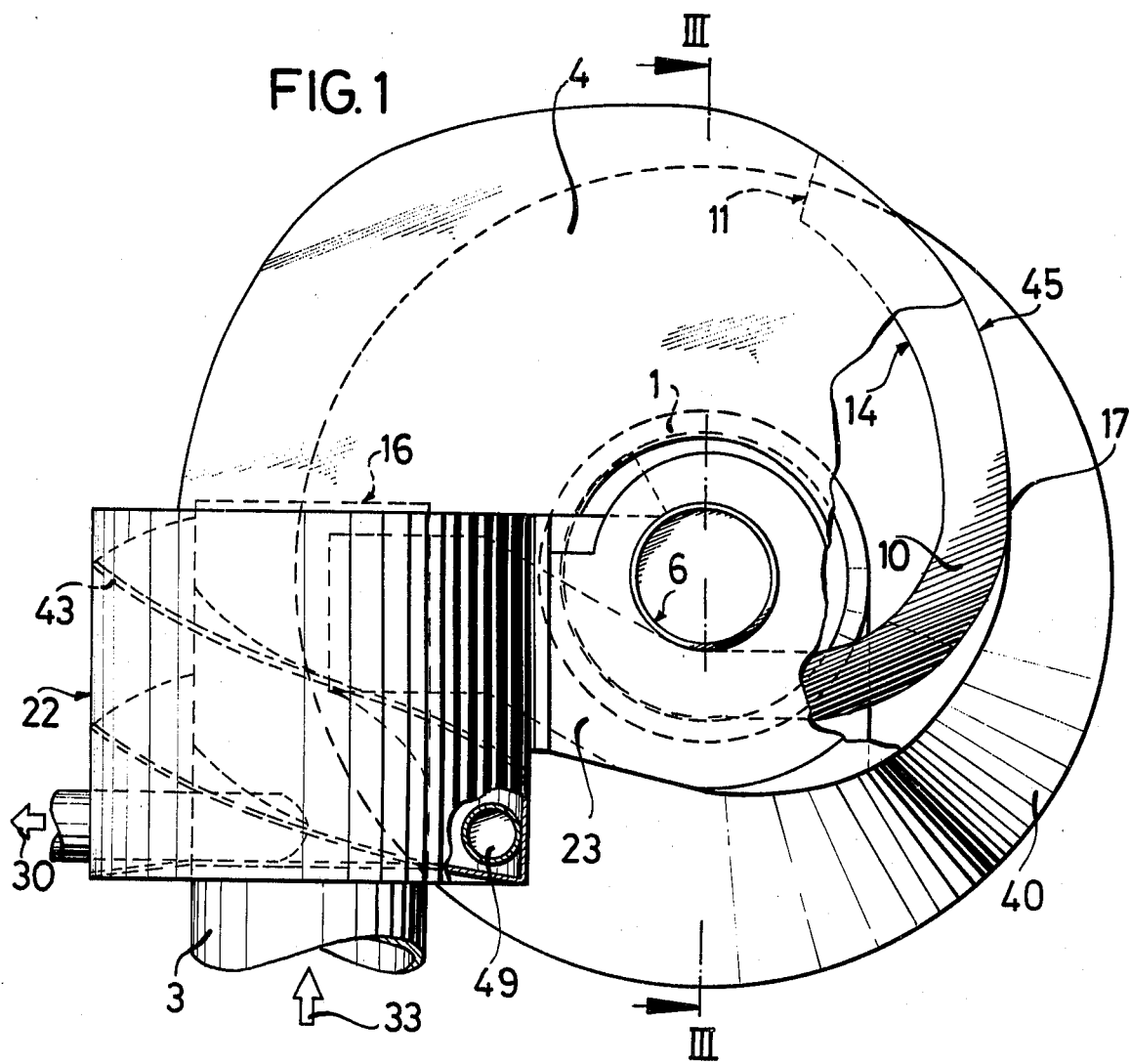
FIG. 1 is a top plan view of the upper part of a cyclone dust separator according to the invention.

FIG. 4 shows a cyclone dust separator which mainly consists of a first annular separator chamber 5 having an outer curved wall 45, an upper wall or cover 4 and a lower wall or base 24; a dust pipe or inlet conduit 3; a second separator chamber 2 defined by a cone 1; a further separating chamber or vessel 8 at the lower end of the cone 1; a collector 9; and housing or casing 48 comprising filter cloth 42 surrounding the cone 1, the said cloth 42 extending between a cover 40 and a base 41 of the said casing 48. The cyclone dust separator is affixed by means of four legs 15 to a base plate 25. The separating vessel 8 is closed at its top by a cover plate 21 and at its bottom by a base cone 20.

Figure 2:
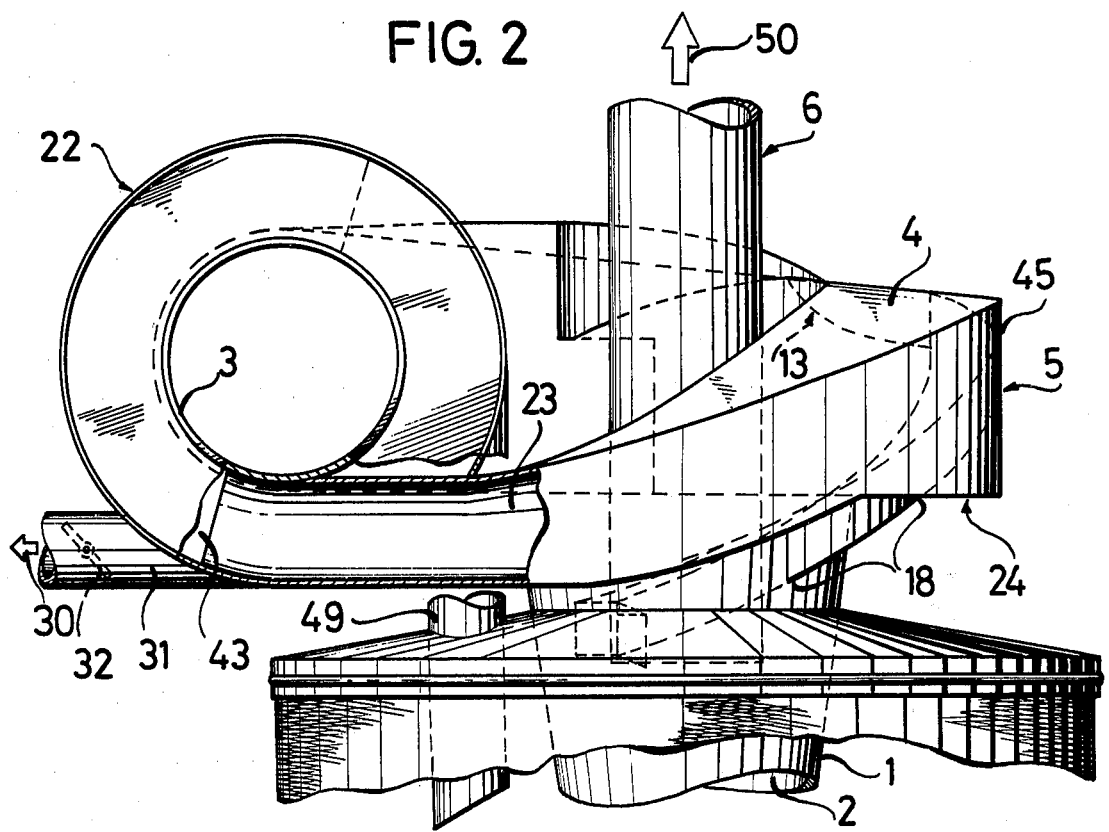
FIG. 2 is a side view of the upper part shown in FIG. 1, seen in the direction towards the connection for a dust pipe carrying a mixture of dust and air.
Figure 3:
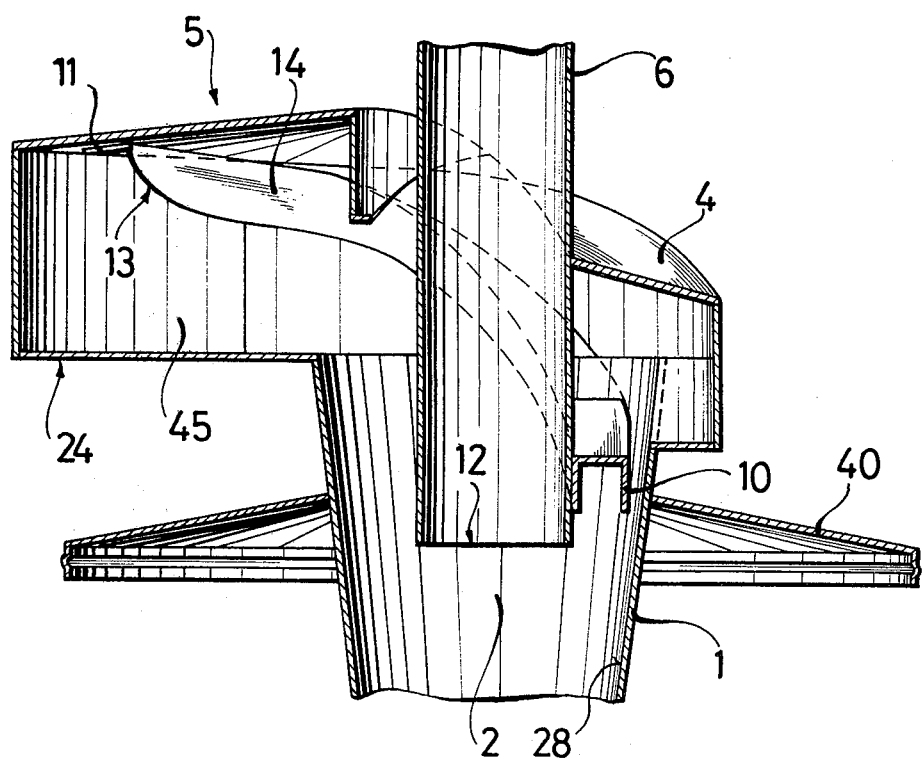
FIG. 3 is a schematic cross section of the upper part along the line III—III in FIG. 1.

A dust-laden current of air is conveyed at a high speed in the direction shown by the arrow 33 (FIG. 1) through the dust pipe 3, which is provided with an inlet aperture 16, to the upper part 5 of the cyclone dust separator, from where part of the said current can enter the cone 1, via a channel 10, for the separation of the particles of dust, while the remainder is conveyed through a pipe 23, after an angle of about 270°, with an approximately circular and inclined, i.e. spiral guiding action, to a third annular separator 22. The channel 10, which extends tangentially and spirally downwards, commences after an angle of 90°-120°, and preferably of 110°, as viewed from the aperture 16 of the dust pipe 3, at the point marked 11 on the outer wall 45 of the upper part 5. The wall 14 of the channel 10 is provided at the beginning with a bevelled part 13 (FIG. 2). The channel 10 is open towards the bottom and leads spirally inwards and downwards, from a point marked 17 (FIG. 1), through the base 24 (FIG. 2) of the upper part 5, to the cone 1 and into the second separating chamber 2. A zone 18 (FIG. 4) of the channel 10 is covered towards the bottom, i.e. it is of rectangular cross section, but is once again open towards the bottom after entering the separating chamber 2, so that in this position the particles of dust become separated along the inner wall 28 of the cone 1 and can fall through the further separating vessel 8 into the collector 9.

In the third annular separator chamber 22 (FIG. 1) spiral deflector plates 43 are provided between the inside 27 of the outer wall 26 of the separator 22 (FIG. 4) and the outer wall 19 of the dust pipe 3, by which plates 43 the current of air coming from the pipe 23, joining the outlet of the first separator chamber to the inlet of the third separator chamber, is guided over a spiral path to outlets 44 and 47 communicating with second and third exhaust pipe conduits 49 and 31 (FIG. 4) connected to the third separator chamber 22. By means of the second exhaust pipe conduit 49 part of the current of air, already partially purified, is conveyed, together with the remaining particles of dust moving along close to the inside 27 of the outer wall 26, through a cover 40 of a housing or casing 48 of the cyclone dust separator, where the particles of dust are deposited. As a means of regulating this current of air a rotary slide valve 37 is affixed to the beginning of the second pipe conduit 49. The third exhaust pipe conduit 31 is attached to the end of the air guiding system of the third separator chamber 22 and can convey purified air to another working space. The quantity of this air can be regulated by means of a rotary slide valve 32.

The current of dust-laden air which is separated in the first annular separator 5 and which is conveyed through the channel 10 into the second separating chamber 2 in the form of a cone 1 separates the particles of dust as a result of the rotation along the inner wall 28 of the cone 1. The air purified in this position leaves the separating chamber 2 via the aperture 12 of a first exhaust pipe conduit 6. The separated particles of dust drop out of the lower end 7 of the cone 1 through the further separating vessel 8, along the inside of the base cone 20 and into the collector 9. Some of the air conveyed through the channel 10 to the separating chamber 2 enters the further separating vessel 8, together with the separated particles of dust, at the lower end 7 of the cone 1, and emerges from outlets or pipe sockets 36 in the cover plate 21 into the housing or casing 48, this system having the advantage of preventing the particles of dust from being stirred up during their removal to the collector 9. The collector 9 is affixed by a detachable collar 29 to the cone end 39 of the base cone 20, so that the collector 9 can be removed and emptied after the current of dust-laden air conveyed to the dust pipe 3 has been shut off.

The walls of the housing or casing 48 include the cover 40, a base 41 and a filter cloth 42 which allows air to pass therethrough. The filter cloth 42 is detachably affixed to the cover 40 and the base 41 of the housing or casing 48 by packing rings 34 and 35. In this position the air emerging from an aperture 46 of the pipe conduit 49 and also that emerging from the pipe sockets 36 is freed of the remaining particles of dust and can flow through the filter cloth 42 in the form of pure air into the space surrounding the cyclone dust separator.

The current of dust-laden air taken in by suction from a number of spaces by means of a fan not shown in the drawings is subdivided in the upper part 5 into two separate currents, the heavily dust-laden current of air taken from the outer wall 45 of the upper part 5 then undergoing the main purification process in the second separator chamber or cone 1, through the channel 10, while the remaining current of air, less seriously contaminated with dust, is conveyed to the third annular separator 22, which forms the circular structure installed in a space-saving manner around the dust pipe 3 of ample diameter. From the separator 22 the current of air now containing only a little dust (arrow 38) is passed via the exhaust pipe conduit 49 into the housing or casing 48 and from this housing or casing 48 through the filter cloth 42 into the surrounding atmosphere, while the doubly purified current of air (arrow 30) is conveyed through the third exhaust pipe conduit 31 to another space. The current of pure air (arrow 50) occurring after the main purification process in the cone 1 can be conveyed to yet a further space. This provides the advantage that the three currents of pure air, after the removal of the dust, are not blown out into the open, as in the older types of dust separators, but remain in the spaces from which the dust has been removed or are returned to these spaces, so that during the cold months the valuable heat content of the air in the heated rooms is preserved.

The invention may be embodied in other specific forms without departing from the spirit or essential characteristics thereof. The embodiment is therefore to be considered in all respects as illustrative and not restrictive.

What is claimed is:

1. A dual cyclone dust separator for exhaust gases and the like comprising:
   (a) a first annular separator chamber having an outer curved wall between upper and lower walls and spiral channel means extending from an inlet to an outlet therein for directing a stream of dust-laden exhaust gases along a spiral path substantially horizontal from said inlet to said outlet, an inlet conduit connected to said inlet of said first annular chamber for directing said stream of dust-laden gases into said first annular chamber and along said spiral path, a second separator chamber extending downwardly from said lower wall of said first annular chamber, and a first exhaust conduit extending upwardly from said second separator chamber, said spiral channel means having an inlet end spaced along said path downstream of said inlet and upstream of said outlet and extending tangentially and progressively downwardly along said outer wall and into said second separator chamber for diverting dust particles separated from said exhaust gases along said outer wall and a first portion of said stream of exhaust gases from said first annular chamber into said second separator chamber while allowing the remaining portion of said stream of said exhaust gases to continue along said spiral path towards said outlet;

(b) said second separator chamber for separating said dust particles from said first portion including means for diverting said first portion of said stream of exhaust gases upwardly through said first exhaust conduit;

(c) a third annular separator chamber having a curved outer wall and an inlet tangential to said outer wall and connected to said outlet of said first annular separator chamber, said third annular chamber having spiral deflector means for directing said remaining portion of said stream of said exhaust gases from said first annular separator along a further spiral path substantially vertical in said third chamber, a second exhaust conduit spaced along said further path from said inlet of said third annular separator chamber and being disposed tangentially to said curved outer wall and extending downwardly for diverting further dust particles and a second portion of said stream of exhaust gases from said third annular separator chamber while allowing the remaining portion of said stream of exhaust gases to continue along said further spiral path, and a third exhaust conduit downstream along said further spiral path from said second exhaust conduit and disposed tangentially to said curved outer wall for exhausting said remaining portion of said exhaust gases in said third annular separator; and (d) separating means connected to said second exhaust conduit for separating said further dust particles from said second portion of said stream of exhaust gases and receiving said further dust particles.

2. A dual cyclone dust separator in accordance with claim 1 wherein said inlet end of said spiral channel means is located at an angle of 90° to 120° from said inlet in said first annular chamber.

3. A dual cyclone dust separator in accordance with claim 2 wherein said inlet end of said spiral channel means is located at an angle of 110° from said inlet in said first annular chamber.

4. A dual cyclone dust separator in accordance with claim 1 wherein said inlet conduit connected to said inlet of said first annular chamber extends axially with respect to said third annular chamber.

5. A dual cyclone dust separator in accordance with claim 1 wherein said second chamber extending downwardly from said lower wall of said first annular chamber is a conical chamber.

6. A dual cyclone dust separator in accordance with claim 5 further comprising a further separating chamber extending downwardly from said conical chamber for receiving said dust particles separated from said first portion of said stream of exhaust gases.

7. A dual cyclone dust separator in accordance with claim 6 wherein said separating means connected to said second exhaust conduit comprises wall means defining a housing surrounding said conical chamber and further separating chamber, said wall means including filter means, said second exhaust conduit being connected to said wall means for directing said further dust particles and second portion of said stream of exhaust gases from said third annular chamber into said housing and filtering said second portion of said stream of exhaust gases to separate said exhaust gases from said further dust particles.

8. A dual cyclone dust separator in accordance with claim 7 wherein said further separating chamber comprises outlet means communicating with the interior of said housing for permitting at least a part of said first portion of said stream of exhaust gases in said further separating chamber to pass through said housing whereby said exhaust gases are filtered by said filter means.

9. A dual cyclone dust separator in accordance with claim 1 wherein both said second exhaust conduit and said third exhaust conduit include valve means for controlling the relative proportions of said exhaust gases passing therethrough.

* * * * *